July 7, 1964  S. MAKOWSKI  3,139,695
FISHING LURE
Filed May 9, 1963
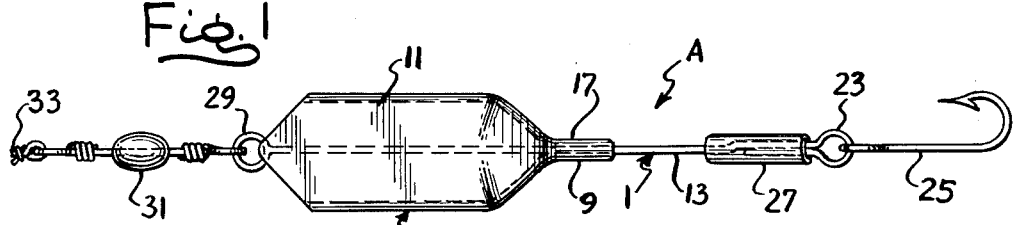
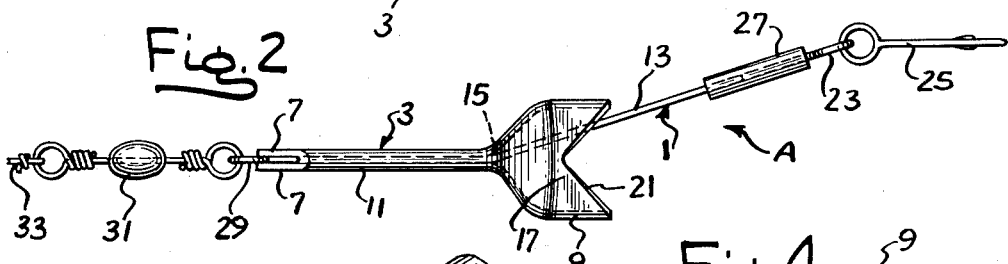
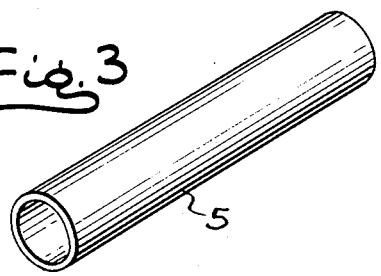
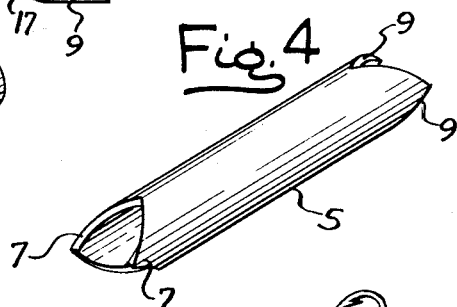
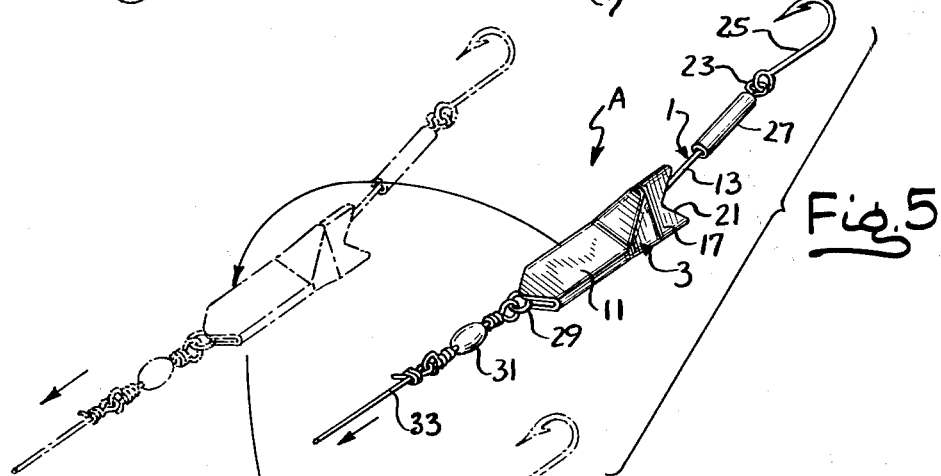
INVENTOR
STEPHEN MAKOWSKI
by: Morris Spector
ATTY.

United States Patent Office 3,139,695
Patented July 7, 1964

3,139,695
FISHING LURE
Stephen Makowski, 1945 S. Troy St., Chicago, Ill.
Filed May 9, 1963, Ser. No. 279,161
7 Claims. (Cl. 43—42.36)

This invention relates in general to fishing tackle, and more particularly to a fishing lure.

It is an object of the present invention to provide a fishing lure that has an action such that the lure varies its depth as it is drawn through the water.

It is a further object of the present invention to provide a lure of the type stated that moves in a rotary path whereby the depth of the moving lure both increases and decreases.

It is also an object of the present invention to provide a fishing lure of the type stated that is relatively inexpensive to fabricate.

It is a more specific object of the present invention to provide a lure that has a wire rod or leader which projects longitudinally through a lure body that comprises a tube flattened at opposite ends respectively in planes at right angles to each other to clamp the rod therein. The rod is shaped so that it enters the lure body at one end approximately at the longitudinal axis of the body, but projects from the other end of the body substantially offset or eccentric to said longitudinal axis, the projected offset end of the rod terminating in a fish hook or in an eyelet or other suitable means by which a fish hook or hook-containing bait may be attached to the rod.

The attainment of the above and further objects of the present invention will be apparent from the following specification taken in conjunction with the accompanying drawing forming a part thereof.

In the drawing:

FIG. 1 is a side elevational view of a lure constructed in accordance with and embodying the present invention;

FIG. 2 is a top plan view thereof;

FIG. 3 is a perspective view of a tubular blank out of which the lure body of the present invention is fabricated;

FIG. 4 is a perspective view of the tubular blank of FIG. 3 and showing a step in the manufacture of the lure body; and FIG. 5 is a perspective view of the lure illustrating, roughly, the rotary action of the lure as it is drawn through the water.

Referring now in more detail and by reference characters to the drawing, which illustrates a preferred embodiment of the present invention, A designates a fishing lure that comprises a wire rod 1 that extends longitudinally through a lure body 3. The lure body 3 is fabricated of a tubular metal blank, such as shown in FIG. 3, and the ends of the blank 5 are cut away to form tongues 7—7, 9—9, as shown in FIG. 4.

To assemble the wire rod 1 with the blank 5 and in part form the body 3, the wire rod 1 is placed within the blank 5 and the latter is flattened in one plane over one section 11 of its length. In the section 11 the flattening is preferably carried out so that the tongues 7, 7 are superimposed and form one end of the body 3. Moreover, the part of the rod 1 that lies within the section 11 is approximately coincidental with the longitudinal axis of the body 3. The apex of the tongues 7, 7 aid in aligning the rod 1.

The part of the rod that is within the section 11 is clinched by the flattened sides of the blank. This enables the remaining length of rod 13 to be bent at 15 so that the rod portion 13 is at an angle to the longitudinal axis of the body 3, as best seen in FIG. 2. The blank is then flattened in a plane at right angles to the section 11 to form an additional flattened section 17 and clinch the rod portion 13 therein. The section 17 is somewhat shorter in length than the section 11. The flattening causes the tongues 9, 9 to form a V notch 21 configuration at the rear of the body 3.

From the foregoing it will be seen that the part 13 of the rod that is in the section 17 is not only at an angle to the longitudinal axis of the body 1, but projects outwardly from the adjacent or rear end 21 of the body 3 at a place which is eccentric to the longitudinal axis of the body 3.

The rod portion 13 may be extend to a point laterally of the section 17, terminating in an eyelet 23 that may receive the eye of a fish hook 25 or other hook containing member. A sleeve 27 is axially slidable on the rod and may be shifted to the left (FIGS. 1 and 2) so that the hook 25 may be removed and replaced. The other end of the rod 1 may also have an eyelet 29 that receives a conventional swivel 31 which, in turn, is joined to a fishing line 33. Before assembly of the rod 1 with the body 3, the sleeve 27 may be placed over the rod 1, the eyelets 23, 29 formed, and the swivel 31 attached to the eyelet 29.

It has been found that by forming the body 1 with the flattened portions 11, 17, and having the rod 1 project from the rear end of the body 3 eccentrically of the longitudinal axis thereof, a rotary or roughly helical motion is imparted to the lure as the line 33 is retrieved, as illustrated in FIG. 5. This action varies the depth of the lure and causes the lure to cover a greater area than so-called "deep going" lures.

It will be apparent also that instead of providing the removable hook, 25, the projected rod part 13 may, itself, be bent into the shape of a hook. Moreover, if desired, a spinner may be mounted on the rod part 13 between the body 3 and sleeve 27.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A fishing lure comprising a tubular member flattened in one plane over a portion of its length and flattened in another plane over another portion of its length, a rod rigidly secured to the member and extending lengthwise of the member and projecting beyond one end of the member, the projected part of the rod being eccentric to the longitudinal axis of the member and having a hook thereon.

2. A fishing lure comprising a tubular member flattened in one plane over a portion of its length and flattened in another place over another portion of its length, and a rod rigidly secured to the member and having a part thereof that is at an acute angle to the longitudinal axis of the member, said part of the rod extending from a point within the member outwardly from one end thereof to a point laterally offset from said end.

3. A fishing lure comprising a tubular member flattened in one plane over a portion of its length and flattened in another plane over another portion of its length, the two flattened portions being at right angles to each other and being at opposite ends of the member, and a rod rigidly secured to the member and having a part thereof that is at an acute angle to the longitudinal axis of the member, said part of the rod extending from a point within the member outwardly from one end thereof to a point laterally offset from said end.

4. A fishing lure comprising a lure body that is formed by a tubular member flattened in one plane over a portion of its length and flattened in another plane over another portion of its length, the flattened portions being at opposite ends respectively of the body, and a rod extending through the body lengthwise thereof and being clinched by the flattened portions, said rod being eccentric to the longitudinal axis of the body in one of said flattened portions and projecting beyond the end of the body at said one flattened portion at an angle to said longitudinal axis of the body.

5. A fishing lure comprising a lure body that is formed by a tubular member flattened in one plane over a portion of its length and flattened in a plane at right angles to the first mentioned plane over another portion of its length, the flattened portions being at opposite ends respectively of the body, a rod extending through the body lengthwise thereof and projecting outwardly from opposite ends of the body and being clinched by the flattened portions, said rod being eccentric to the longitudinal axis of the body in one of the flattened portions and also in the part of the rod that projects beyond the end of the body at said one flattened portion, and means on said projected part of the rod for receiving a fish hook.

6. A fishing lure comprising a lure body that is formed by a tubular member flattened in one plane over a portion of its length and flattened in a plane at right angles to the first mentioned plane over another portion of its length, the flattened portions being at opposite ends respectively of the body, a rod extending through the body lengthwise thereof and projecting outwardly from opposite ends of the body and being clinched by the flattened portions, said rod being approximately on the longitudinal axis of the body in one of the sections and being bent within the body so as to lie at an acute angle to said longitudinal axis and to project beyond the end of the body at the other section.

7. A fishing lure comprising a lure body that is formed by a tubular member flattened in one plane over a portion of its length and flattened in a plane at right angles to the first mentioned plane over another portion of its length, the flattened portions being at opposite ends respectively of the body and said opposite ends having portions of the member cut away therefrom, a wire rod extending through the body lengthwise thereof and projecting outwardly from said opposite ends of the body and being clinched by the flattened portions, said rod being approximately on the longitudinal axis of the body in one of the sections and being bent within the other of the sections so as to lie at an acute angle to said longitudinal axis and to project beyond the end of the body at said other section eccentric to said longitudinal axis, and a hook on the projected part of the rod.

No references cited.